United States Patent Office 3,810,812
Patented May 14, 1974

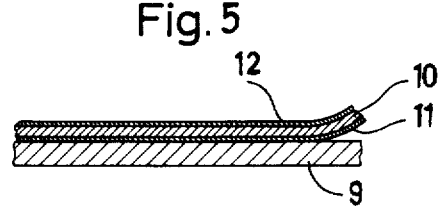
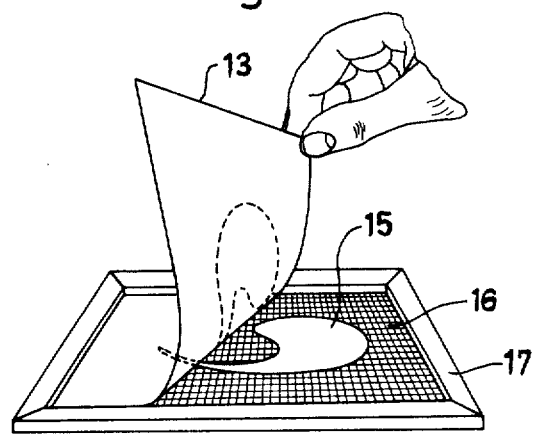

3,810,812
COVERING MASK
Claus Koenig, 114 Paul-Gossen-Str.,
852 Erlangen, Germany
Continuation-in-part of abandoned application Ser. No. 755,154, Aug. 26, 1968. This application July 12, 1971, Ser. No. 161,862
Int. Cl. B44f 1/06; G03c 7/20
U.S. Cl. 161—1                                    15 Claims

ABSTRACT OF THE DISCLOSURE

A mask for covering, for example images to be reproduced, comprises a transparent substrate, coated with a dimensionally stable thin sheet or film, for example, of synthetic material comprising light filtering tinting means and adapted for inscribing therein image countour outlining cuts, said coating being accomplished by slightly adhesive means which stick to the sheet or film rather than to the substrate upon removing cut surrounding portions of the sheet or film from the substrate. Especially for screen printing processes the sheet or film may be provided on one surface with said adhesive means and on the opposite surface thereof with a holding layer which is more adhesive than said slightly adhesive means.

BACKGROUND OF THE INVENTION

The present application is a continuation-in-part application of my copending application Ser. No. 755,154, filed Aug. 26, 1968, now abandoned.

The present invention relates to covering masks, more specifically photographic masks suitable for photographing out of images or pictures certain portions, or for emphasizing or suppressing certain colors of an image to be reproduced.

It is known to cover images to be reproduced by masks for the just mentioned purposes whereby the mask leaves uncovered only those portions necessary or desirable for the particular purpose.

These masks may also be used for filtering out portions of a copyable image, for example, by covering a film negative with a respective mask whereby the copying is limited to the uncovered portions of the film negative. It is also possible to make color corrections along with the copying by using suitable masks for color suppression or emphasis.

In the prior art masks have been used which comprise a transparent leaf or sheet coated with a lacquer layer of a given color whereby the colored lacquer layer functions as a light filter so that light rays falling upon such lacquer layer are either absorbed or that only light of a given wavelength is permitted to pass such lacquer layer. In order to produce a mask out of a lacquer coated leaf, the lacquer coating is scribed along a line corresponding to the contours of the images to be reproduced whereupon the portions of the lacquer coating which is surrounded by a scribed line is removed from the transparent leaf.

These masks have the drawback that the heat and moisture resistance of the colored lacquer coating is poor, For example, such colored lacquer coatings tend to expand or shrink under the influence of heat and moisture. Furthermore, it is frequently necessary to use as a mask also the portions which have been removed from the substate, for example, when relatively small areas, especially lettering, are to be covered for which purpose the colored lacquer coating which has been removed from the transparent substrate and which has a predetermined contour is to be placed on the image to be reproduced. Especially in this instance the colored lacquer layer is very disadvantageous because it does not retain its special shape once it is removed from the substrate.

OBJECTS OF THE INVENTION

In view of the above it is an object of this invention to provide an improved mask or masking material which will not influence or affect the area to be covered in any manner other than the intended manner.

It is a further object of the invention to provide a mask for photographic purposes for covering certain parts of an image to be reproduced whereby only the portion not covered by the mask may be reproduced.

Yet another object of the invention is to provide a mask for color correction either by emphasizing or suppressing certain colors.

A still further object of the invention is to provide a photographic mask which is heat and moisture resistant. Stated differently, the invention aims at providing a mask for photographic purposes which will retain its accurate size and dimensions as well as spacial shape even under adverse temperature and moisture conditions. That is, neither the mask nor its elements shall shrink or expand or otherwise change its usefulness under adverse conditions.

It is yet a further object of the invention to provide a photographic mask which has a covering which after removal from a substrate may be used itself as a mask.

SUMMARY OF THE INVENTION

The above objects have been attained according to the invention by a mask which comprises a transparent substrate provided with a thin covering leaf in the form of a synthetic sheet of a material which remains dimensionally stable and which is provided with a light filtering dye. The material of the covering is suitable to be inscribed with contour lines and is secured to the substrate by double stick adhesive means which stick more strongly to the leaf than to the substrate whereby portions which are defined by said contours and which have been removed from the substrate retain the adhesive means.

There are several different possibilities for adding color or tinting dye to the covering leaf. For example, the covering leaf may itself be tinted. Besides, it is possible to use a colored glue as the adhesive means or tint the glue itself.

It is an important advantage of the invention that inscribing the contours on the covering leaf results simultaneously in two masks, a positive mask and a negative mask so to speak because the portions of the covering leaf which have been removed from a transparent substrate may also serve as mask. Such mask may be securely placed on an image or a lettering because the adhesive adheres to the removed leaf portions. Such adhesiveness, however, is rather slight because a slightly adhesive glue is used according to the invention so that even this mask may be removed from its support without any difficulties.

Producing in a simple manner positive as well as negative masks in a single process is especially desirable for many applications. In this instance the transparent substrate with the portion of the covering leaf remaining thereon may serve as the negative mask, while the portion of the leaf removed from the substrate provides the corresponding positive mask.

BRIEF FIGURE DESCRIPTION

In order that the invention may be clearly understood it will now be described, by way of example, with reference to the accompanying drawings, wherein:

FIG. 5 illustrates another embodiment of a multilayer masking material according to the invention which is especially useful for the screen printing process; and FIG. 6 shows the removal of the substrate from a supporting screen, whereby a mask or template remains on the screen.

DETAILED DESCRIPTION OF THE EXAMPLE EMBODIMENTS

Figure 1:
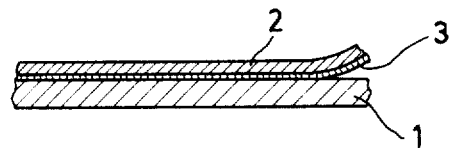
FIG. 1 shows a cross section through the masking material according to the invention.

FIG. 1 shows, on an enlarged scale, a section through the masking material according to the invention. A clear, transparent substrate 1, for example made of plastics such as cellophane, is covered by a thin covering leaf 2 made, for example, of triacetate which may be colored or tinted. The covering leaf may also be made of a polyester film, for example, known under the registered trademark "Mylar" which has an especially good dimensional stability. The thickness of the covering leaf may be, for example, 75 mils.

By dimensional stability is meant, that the covering leaf will neither shrink nor expand nor otherwise change its shape under adverse temperature and/or moisture conditions. According to the invention the cover leaf 2 is glued to the substrate 1 by double stick adhesive means having a controlled adhesiveness.

The double stick means may, for example, comprise a layer 3 of a glue composition having the following mixture components expressed by weight of the composition:

20% to 30% of rubber,
12% to 2% of siloxane, and
68% of solvent for the rubber and siloxane.

The solvent may, for example, be a ketone, an ester, or an aromatic hydrocarbon. The glue composition comprising 20% rubber, 12% siloxane and 68% solvent is preferred because it results in an especially light adhesiveness which is desirable for the present invention.

At the right hand end of FIG. 1 it is shown how the sheet 2 with the glue 3 sticking thereto is removed from the substrate 1. Thus, it is seen that the glue 3 disengages itself from the substrate 1.

This feature that the glue 3 upon removal of a portion of the covering leaf 2 from the substrate 1 sticks to the removed portion of the covering leaf and not to the substrate may be accomplished in several ways. For example, the glue contacting surface of the covering leaf 2 may be roughened, in the simplest manner by mechanical means such as sandpaper or by a fine sand blasting. On the other hand, the glue contacting surface of the substrate 1 is smooth. The glue enters into a more intimate adhesion with the roughened surface of the covering leaf 2 than with the smooth surface of the substrate 1 whereby, surprisingly, with the same glue two distinctly different adhesivenesses are achieved if a lightly adhesive glue as taught by this invention is combined with the above mentioned different surface finishes.

A rough glue contacting surface may also be achieved for the covering leaf 2 by using a synthetic material which is initially produced with one mat surface. Such materials of the above mentioned types, for example, a triacetate, are readily available on the market.

Figure 2:
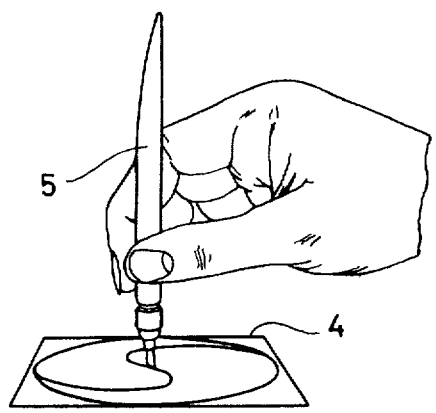
FIG. 2 illustrates the inscribing of an image contour.

FIG. 2 shows a sheet 4 of the masking material according to the invention into which a contour 4' is inscribed by means of a knife 5 whereby the covering leaf 2 with the light filtering color is provided with a tearing line which outlines said contour along which the respective portion 6 of the covering leaf 2 may be removed.

Figure 3:
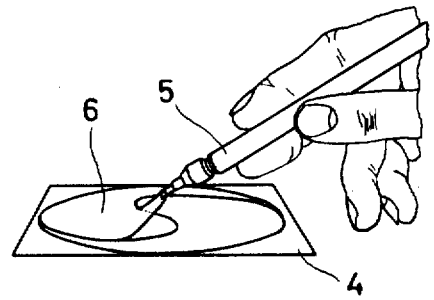
FIG. 3 shows how a portion surrounded by an inscribed image contour line is removed from a substrate.

The removal of the portion 6 of the covering layer is shown in FIG. 3. The knife 5 is merely used to reach, at any place, under the covering leaf to thereby lift part of it. Thereafter the covering leaf 2 may be removed by pulling the lift part whereby the covering leaf will tear along the inscribed tearing line and thereby disengage itself from the substrate while simultaneously sticking to the glue. After the complete removal of the covering leaf portion 6 which is surrounded by an inscribed contour line, a mask is produced which comprises a clear, transparent portion of the substrate 1 surrounded by a portion still covered by the remaining covering leaf 2 with its light filtering characteristics so that, upon exposure of the mask, it will permit light to pass only through those portions from which the covering leaf 2 has been removed. The light is filtered where the covering leaf 2 has not been removed. Accordingly, a light sensitive paper under the mask will receive an exposure as defined by the mask.

Figure 4:
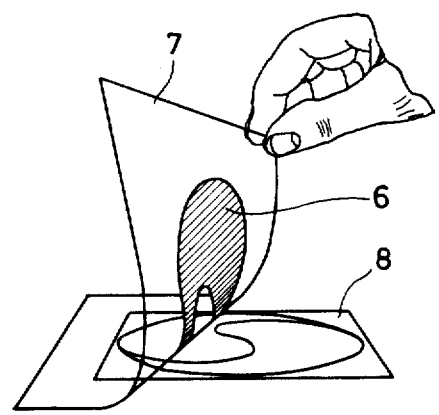
FIG. 4 shows how a removed portion of a sheet of synthetic material is laid on top of a drawing whereby the removed portion is first placed on another transparent substrate.

FIG. 4 illustrates how the pulled off portion 6 of the covering leaf 2 itself may be used as a mask. Such portion 6 is glued to another clear, transparent backing 7 by means of the glue 3 which adhered to the covering leaf portion 6 when such portion 6 was removed from the substrate 1. Thus a new mask is produced which constitutes the positive to the mask illustrated in FIG. 3. As seen in FIG. 4 the mask with the portion 6 is now placed on a drawing 8 which, in this example, comprises lines corresponding to that of the mask. In this manner the masking material is utilized twice so to speak because the covering layer itself, or rather the removed portion thereof, is also used as a mask.

It is also possible to apply the removed portion 6 directly to an image or a drawing without first attaching it to a backing as shown in FIG. 4. In this instance, the glue 3 will adhere with the portion 6 to the image or drawing and due to the light adhesiveness of the glue, portion 6 may easily be removed again.

Another advantage of the masking material according to the invention resides in the fact that the pulled off or removed synthetic covering leaf 2 can be used again for making smaller masks and thus need not be discarded. For example, masks in the shape of lettering may be produced from these pulled off portions whereby such masks may be either glued to a clear, transparent backing or they may be applied directly to an image to be reproduced.

In addition to the foregoing the present multilayer material may be used for further masking purposes, especially in connection with screen printing processes.

In the screen printing process masks or templates are applied to a screen. The masks or templates assure that the printing ink can penetrate only those portions of the screen which are not covered by the mask or template. Thus, the printing will appear ondly on the portion of a paper which is not covered by the screen. It is known to produce such screen printing masks by cutting their contours out of a single layer material having a surface which may be made adhesive by means of a solvent so that such a cut-out mask or template may adhere to the screen with its adhesive surface.

Contrary to the above, the invention employs a multilayer material comprising a substrate and adhering thereto through a layer of glue a thin pull-off leaf, the latter being capable of being inscribed by lines defining contours whereby portions of the leaf defined or surrounded by such contours may be pulled off the substrate.

The range of applications of such multilayer material is further increased, especially with a view to its use as a mask or template in screen printing, in accordance with the invention, in that the pull-off covering leaf is provided on its surface facing away from said double stick means with an adhesion layer 12 (FIG. 5), preferably an inherently adhesive layer 12 capable of being activated for adhesion, for example, by pressure or by means of a solvent. The layer 12 has an adhesiveness which is larger than that between the covering leaf and the substrate. If new the mask is attached to a support, such as a screen for screen printing, those portions of the leaf which previously adhered to the substrate of the mask will now adhere to the support due to said larger adhesiveness and will no longer stick to said substrate. Such larger adhesiveness may, for example, be achieved by a glue layer comprising 30% by weight of rubber, 2% by weight of siloxane, and 68% of a solvent as mentioned above.

When using the multilayer material of the present invention in connection with screen printing, a desired portion of the covering leaf is removed after the respective contours have been inscribed. Such material is now placed on the screen. The adhesion layer 12 on the cover leaf portions which have not yet been removed is now made adhesive, for example, with a solvent. The layer 12 may also be made adhesive prior to placing the material on the screen. Therefter, the substrate may be pulled off and the portions of the cover leaf which previously adhered to the substrate will now adhere to the screen thus forming the mask or the template on the screen.

In order to achieve an especially durable adhesiveness it may be useful to employ a substantially non-volatile solvent for making the layer 12 adhesive.

Furthermore, it is a special advantage of the invention that the portion of the cover leaf which has been pulled off or removed from the substrate may be used itself as a mask or template whereby such pulled off portion is to be placed with its inherently adhesive layer 12 on the screen, whereupon the layer 12 is made adhesive. Thus, one may produce masks or templates which represent a positive as well as a negative which is rather advantageous for many purposes. Besides, the inscribing of the contour lines into the cover leaf adhering to the substrate may be done more precisely than the cutting of a mask or template out of a single layer material because the lamination gives the sheet material more body.

FIG. 5 illustrates a sectional view through an embodiment of the masking material according to the invention having the above mentioned adhesive layer 12. The dimensions are on an enlarged scale. To a backing or substrate 9 which may be of cellophane there is attached as a covering layer a thin strip or pull-off leaf 10 of synthetic material or any other material suitable to form a covering film. One surface of the strip leaf 10 is glued to the backing or substrate 9 by means of a first adhesive layer 11 which has a relatively low adhesiveness as described above with reference to the double stick means 3, so that the cover leaf 10 may be easily stripped from the backing 9 or vice versa. Such stripping is shown at the right hand end of FIG. 5. The above mentioned second inherently adhesive layer 12 is provided on the other surface of the leaf 10.

For producing a mask, the material shown on FIG. 5 may be treated in the same manner as has been described with reference to FIGS. 2 and 3. Thus contour lines may be inscribed with a knife or scribe or with a stamping tool having knife edges outlining such contours. Further, not only the portion 6 surrounded by an inscribed contour line will be stripped from the substrate, but the surrounding portions of the multilayer material 4 may also be stripped off the substrate so that a mask results which may be applied to a support, particularly to a screen, for the screen printing process.

FIG. 6 illustrates how the mask may be applied to the screen. The screen 16 is stretched in a frame 17. A substrate 13 fits into the frame 17. The substrate 13 is applied to the screen 16 so that the portion 15 of the strip cover sheet contacts the screen 16, after the second adhesive layer 12 on the portion 15 of the cover sheet has been activated, for example by means of a solvent, whereby the portion 15 will attach itself to the screen 16, so to speak, and stick to it, whereupon the substrate 13 may be stripped whereby the portion 15 of the cover sheet will detach itself from the substrate 13 to which it was sticking within the contour shown by a dashed ine 13'. Thus, the portion 15 remains on the screen 16 as a mask or template so that during a subsequent screen printing no printing will appear on the area cover by the portion 15.

Furthermore, it is also possible to employ as a mask or template on the screen, the portion which has been stripped off its substrate as shown in FIG. 3. Here, such portion is merely to be applied to the screen whereafter the so applied portion may be connected with the screen by means of an adhesion as described above. In this manner it is possible to produce a positive as well as a negative and to use it as a mask or template.

The presently best known mode of making the present laminated material is to provide a sheet of triacetate film with a rough surface, for example, by applying to it a coat of a mixture of polyacrylicacidic ester and aluminum oxide. Thereafter a coat of a slightly adhesive mixture of 20% rubber, 12% siloxane, and 68% of a solvent for the rubber and siloxane as disclosed above is applied to the roughened surface of the triacetate film. Thereafter, the substrate such as a sheet of 'Mylar" (R.T.M.) and the adhesive coat are brought into contact with each other and the resulting laminated material is cut into pieces of suitable size.

Although the invention has been described with reference to specific embodiments, it is to be understood that it is intended to cover all modifications and equivalents within the scope of the appended claims. For example, the double stick means 3, may also be accomplished by coating both surfaces of an intermediate sheet with adhesive layers having different adhesiveness. Thus, the layer facing the covering leaf 2 may comprise 30% of rubber and the layer facing the substrate 1 may comprise 20% of rubber in accordance with the above examples.

Although in the above examples it is said that covering leaf 2 is to be of dimensionally stable material such as triacetate film, it is preferable that the substrate 1 is also of dimensionally stable material such as a polyester film or sheet. The use of two dimensionally stable means applies to the laminated masking material as well as to the mask itself.

Although the invention has been described with reference to specific examples, it is to be understood that it is intended to cover all modifications and equivalents within the scope or the appended claims.

What I claim is:

1. In a laminated sheet material for making covering masks, including a substrate, a thin covering leaf of synthetic material, and double sticking means for securing one surface of the covering leaf to the substrate, the improvement comprising said substrate made of transparent, clear material, said coveing leaf made of transparent dimensionally stable uniformly colored or tinted synthetic material including said coloring or tinting in the synthetic material itself for filtering light of predetermined color, and wherein said double sticking means is transparent and has a first adhesiveness relative to the covering leaf and a second adhesiveness relative to the substrate, said second adhesiveness being smaller than the first adhesiveness such that the adhesive layer sticks more strongly to the covering leaf than to the substrate when a portion of the covering leaf is removed from the substrate, whereby the substrate with the covering leaf remaining theron forms a negative mask and said removed portion forms a respective positive mask.

2. The laminated material according to claim 1, wherein said one surface of the covering leaf is roughened, wherein said substrate has a smooth surface facing said roughened surface of the covering leaf, and wherein said double sticking means comprise an adhesive layer which sticks, due to said roughened surface, to the covering leaf with said first adhesiveness and which sticks, due to said smooth surface, with the second adhesiveness to said substrate.

3. The laminated material according to claim 2, wherein said adhesive layer comprises a mixture of from 20 to 30 percent by weight of rubber, 2 to 12 percent by weight of siloxane and the remainder being a solvent for said rubber and siloxane.

4. The laminated material according to claim 1, wherein said double sticking means comprises a first layer of adhesive material facing said covering leaf and a second layer of adhesive material facing said substrate, said adhesive material of the first layer comprising a higher adhesiveness than that of the adhesive material of the second layer.

5. The laminated material according to claim 4, wherein said adhesive material of the first layer comprises a mixture of 30 percent by weight of rubber, 2 percent by weight of siloxane, the remainder being a solvent for said rubber and siloxane; said adhesive material of the second layer comprising a mixture of 20 percent by weight of rubber, 12 percent by weight of siloxane, the remainder being said solvent, whereby the adhesiveness of said first layer is higher than that of said second layer.

6. The laminated material according to claim 4, further comprising a transparent carrier member located between said first and second layers of adhesive material.

7. The laminated material according to claim 1, wherein said adhesive layer is tinted.

8. The laminated material according to claim 1, further comprising a second, inherently adhesive transparent layer secured to the other surface of said dimensionally stable covering leaf, said second inherently adhesive layer providing a third adhesiveness relative to said othter surface of the dimensionally stable covering leaf, said third adhesiveness being larger than said second adhesiveness.

9. The laminated material according to claim 8, wherein said third adhesiveness of the second, inherently adhesive layer is activatable.

10. The laminated material according to claim 8, wherein said second inherently adhesive layer comprises a mixture of 25 percent to 30 percent by weight of rubber, 2 percent to 7 percent by weight of siloxane, and the remainder being a solvent for said rubber and siloxane, whereby said third adhesiveness is larger than said second adhesiveness.

11. A covering mask made of a laminated material, comprising a substrate of transparent clear material, a thin transparent, dimensionally stable covering leaf made of synthetic material, and transparent double sticking adhesive means for securing one surface of the covering leaf to the substrate, image contours inscribed in said covering leaf for defining masking areas, said double stick adhesive means having a first adhesiveness relative to the covering leaf and a smaller second adhesiveness relative to the substrate such that the adhesive layer sticks more strongly to the covering leaf than to the substrate whereby the adhesive means are retained on the covering leaf when predeterminded portions of the covering leaf are removed from the substrate and a uniform color tinting in said dimensionally stable covering leaf or in said double sticking adhesive means for filtering light of predetermined color.

12. The covering mask according to claim 11, wherein said removed portions form a mask.

13. The covering mask according to claim 11, wherein the substrate and the covering leaf are both of dimensionally stable material.

14. The laminated material according to claim 1, wherein the substrate and the covering leaf are both of dimensionally stable material.

15. In a laminated sheet material for making photographic masks, including a substrate, a thin covering leaf of synthetic material, and double sticking means for securing one surface of the covering leaf to the substrate; the improvement wherein said substrate is made of a transparent, clear material, said covering leaf is made of a transparent dimensionally stable synthetic material, and wherein said double sticking means is transparent and has a first adhesiveness relative to said covering leaf and a second adhesiveness relative to said substrate, said second adhesiveness being smaller than said first adhesiveness, whereby the adhesive layer sticks more strongly to said covering leaf than to said substrate when a portion of the covering leaf is removed from the substrate, said double sticking means being uniformly colored or tinted so that the coloring or tinting is part of the double sticking means itself to filter light of a predetermined color, whereby portions of said covering leaf with said double sticking means adhering thereto may be removed from said substrate to form a first mask from the removed portion of the covering layer and a second mask of the substrate and the portion of the covering layer remaining thereon.

References Cited

UNITED STATES PATENTS

| | | | |
|---|---|---|---|
| 1,850,760 | 3/1932 | Mantell | 161—244 |
| 2,308,900 | 1/1943 | Tryone et al. | 41—4.5 |

WILLIAM J. VAN BALEN, Primary Examiner

C. E. LIPSEY, Assistant Examiner

U.S. Cl. X.R.

156—247, 248, 249, 267, 268; 161—39, 209, 231, 244, 406, 408; 355—125

UNITED STATES PATENT OFFICE
CERTIFICATE OF CORRECTION

Patent No. 3,810,812      Dated May 14, 1974

Inventor(s) Claus Koenig

It is certified that error appears in the above-identified patent and that said Letters Patent are hereby corrected as shown below:

[30] Foreign Application Priority Data:

August 25, 1967      Germany      K 63 209 VIb/75c

December 23, 1967      Germany      K 64 324 VIb/15 1

In column 7, line 21 after "transparent" insert
        --intermediate--

In column 7, line 29 replace "othter" by --other--

Signed and sealed this 24th day of September 1974.

(SEAL)
Attest:

McCOY M. GIBSON JR.          C. MARSHALL DANN
Attesting Officer          Commissioner of Patents